US012133830B2

(12) United States Patent
Upendram

(10) Patent No.: US 12,133,830 B2
(45) Date of Patent: Nov. 5, 2024

(54) PHARMACEUTICAL CONTAINER AND METHOD

(71) Applicant: Sailendra Upendram, Nokomis, FL (US)

(72) Inventor: Sailendra Upendram, Nokomis, FL (US)

( * ) Notice: Subject to any disclaimer, the term of this patent is extended or adjusted under 35 U.S.C. 154(b) by 463 days.

(21) Appl. No.: 16/791,821

(22) Filed: Feb. 14, 2020

(65) Prior Publication Data

US 2020/0261312 A1 Aug. 20, 2020

Related U.S. Application Data

(60) Provisional application No. 62/806,305, filed on Feb. 15, 2019.

(51) Int. Cl.
*A61J 1/03* (2023.01)

(52) U.S. Cl.
CPC ............ *A61J 1/035* (2013.01); *A61J 2205/30* (2013.01); *A61J 2205/50* (2013.01)

(58) Field of Classification Search
CPC .... A61J 1/035; A61J 2205/30; A61J 2205/50; B65D 5/425; B65D 5/4212
USPC ...... 206/540, 528, 538, 484, 459.5; 604/404
See application file for complete search history.

(56) References Cited

U.S. PATENT DOCUMENTS 4,972,657 A * 11/1990 McKee ................ B65D 33/002 53/449
5,908,113 A 6/1999 Takemasa
6,121,249 A 9/2000 Weissman
6,323,188 B1 11/2001 Weissman
8,096,417 B2 * 1/2012 Iwao ..................... A61F 15/001 206/484
2002/0104774 A1 * 8/2002 Hammond .............. A61F 17/00 206/570
2004/0124115 A1 7/2004 Nishimura et al.
2004/0168951 A1 9/2004 Mackie, Jr.
2004/0217038 A1 * 11/2004 Gibson ................. A61J 7/0084 206/534
2005/0202085 A1 9/2005 Lovercheck
2006/0065670 A1 * 3/2006 Doublet .................. A61J 1/035 206/534
2007/0045147 A1 * 3/2007 Baker ................ B65D 83/0463 206/538

(Continued)

FOREIGN PATENT DOCUMENTS

KR 10-2011-0115200 10/2011
WO PCT/US2020/018393 2/2019

OTHER PUBLICATIONS

EM Basic, Anaphylaxis Part 1—Diagnosis and Treatment. 2012http://embasic.org/wp-content/uploads/2013/07/32-anaphylaxis-part-1-diagnosis-and-treatmentdocx.pdf.

*Primary Examiner* — Steven A. Reynolds
(74) *Attorney, Agent, or Firm* — Frijouf, Rust & Pyle, P.A.

(57) ABSTRACT

A pharmaceutical container houses a substance for treating an individual having a medical condition. A disposable pouch has a primary layer and a secondary layer and defining a pouch chamber. A first pharmaceutical substance is within the pouch chamber for treating the medical condition. A second pharmaceutical substance is within the pouch chamber for treating the medical condition. The first pharmaceutical substance and the second pharmaceutical substance define a fixed-dose combination drug for ingestion by the individual for treating the medical condition.

13 Claims, 15 Drawing Sheets

(56) References Cited

U.S. PATENT DOCUMENTS

| | | | | |
|---|---|---|---|---|
| 2007/0235366 | A1 | 10/2007 | Desai et al. | |
| 2010/0069213 | A1* | 3/2010 | Luciano, Jr. | G16H 20/13 493/238 |
| 2010/0100391 | A1 | 4/2010 | Daya et al. | |
| 2010/0305975 | A1 | 12/2010 | Daya et al. | |
| 2011/0100863 | A1* | 5/2011 | Luciano | A61J 1/03 53/473 |
| 2012/0097560 | A1* | 4/2012 | Contractor | A61J 1/03 206/232 |
| 2012/0101630 | A1 | 4/2012 | Daya et al. | |
| 2012/0305177 | A1* | 12/2012 | Simmons | A61J 1/03 156/247 |
| 2013/0228487 | A1 | 9/2013 | Gorman | |
| 2013/0281960 | A1 | 10/2013 | Hanley | |
| 2016/0051494 | A1 | 2/2016 | Gulfo | |
| 2017/0252402 | A1* | 9/2017 | Tsukamoto | A61K 38/1709 |
| 2017/0340403 | A1 | 11/2017 | Roberts-Monteleone | |

* cited by examiner

PHARMACEUTICAL CONTAINER AND METHOD

CROSS-REFERENCE TO RELATED APPLICATIONS

This application claims benefit of U.S. Patent Provisional application No. 62/806,305 filed Feb. 15, 2019. All subject matter set forth in provisional application No. 62/806,305 is hereby incorporated by reference into the present application as if fully set forth herein.

BACKGROUND OF THE INVENTION

Field of the Invention

This invention relates to a pharmaceutical container and method and more particularly to a pharmaceutical disposable pouch and method.

Background of the Invention

There are numerous medical conditions that individuals may experience that require immediate attention. One of such medical condition includes coronary artery disease. Another such medical condition includes an allergic reaction. If these medical conditions are severe an individual may have very little time to seek medical attention or the individual have permanent damage or even death.

If an individual is taken to an emergency room with a severe medical condition, in many instances the individual is immediately given two or more medications in an effort to avert any permanent damage or death. The two or more medications are believed to treat multiple effects of the medical conditions. In addition the two or more medications may improve the effectiveness of treating the medical conditions.

It is therefore in the best interest of the individual to two in just the two or more medications as soon as possible. Preferably, the tour more medications should be taken as the first sign of the medical condition. It would be therefore very beneficial to have a pharmaceutical container that is easily identifiable and includes the tour more medications that are needed to treat the medical condition.

There have been many in the prior art who have attempted to solve these problems with varying degrees of success. None, however completely satisfies the requirements for a complete solution to the aforestated problem. The following U. S. Patents and Patent Applications are attempts of the prior art to solve this problem.

U.S. Pat. No. 6,121,249 to Weissman et al. discloses a method of reducing the incidence and severity of atherosclerosis, atherosclerotic central nervous system disease, claudication, coronary artery disease, homocystine related disorders, hypertension, peripheral vascular disease, presenile dementia and/or restenosis in humans by daily administration of an effective amount of a combination of acetylsalicylic acid (ASA), at least one antioxidant, a cyanocobalamin compound (Vitamin B12), a folic acid compound, a pyridoxine compound (Vitamin B6) and a niacin compound.

U.S. Pat. No. 6,323,188 to Weissman discloses a method of reducing the incidence and severity of stroke, primary heart attack, and any subsequent heart attack or stroke in humans by daily administration of an effective amount of a combination of acetylsalicylic acid (ASA), a cyanocobalamin compound (Vitamin B12), a folic acid compound, and a pyridoxine compound (Vitamin B6) in an easy to take daily administration pack.

U.S. Patent Application 2004/0168951 to Mackie, Jr. discloses a method and system for the self-administration of medication is provided. This method manages the types, dosages and sequencing of medication in order to facilitate its most effective administration. This method and system is particularly adapted for embodiments useful for the treatment of acute coronary syndrome and for diarrhea. The system includes a medication kit, which itself includes medication cards, information and a mechanism for sequencing the administration of the medication.

U.S. Patent Application 2005/0202085 to Lovercheck discloses a unit dose of an orally consumable material, having a predetermined pharmaceutically effective amount of at least one nonprescription discomfort reliever and a predetermined nutritionally effective amount of at least one nutritional supplement. Each unit dose may be in a container having indications of the amount discomfort reliever and the amount of nutritional supplement in each unit dose. Instructions are provided for consuming the material for discomfort relief and supplementing nutrition. Consumption of the unit dose simultaneously relieves discomfort and supplements nutrition.

U.S. Patent Application 2010/0100391 to Daya et al. discloses a disease management system including: a Diagnostic Module, which provides access to patient information and scientific guidelines for patient treatment; a Diagnostic Interpretive Module, which provides tools to evaluate risk of particular diseases or conditions based on patient information and an evaluative methodology; a Prescriptive Module, which is used to recommend, select, and/or evaluate one or more treatment regimens based on patient information and guidelines; a Dispensing Module, which evaluates a patient's compliance with a treatment regimen; and/or a Feedback and Patient Management Module, which gathers compliance information and evaluates efficacy of a treatment regimen for a patient. In embodiments of the subject invention, some or all of the modules described can communicate to manage a disease, medical condition, and/or health problem in a patient.

U.S. Patent Application 2010/0305975 to Daya et al. discloses a disease management system including: a Diagnostic Module, which provides access to patient information and scientific guidelines for patient treatment; a Diagnostic Interpretive Module, which provides tools to evaluate risk of particular diseases or conditions based on patient information and an evaluative methodology; a Prescriptive Module, which is used to recommend, select, and/or evaluate one or more treatment regimens based on patient information and guidelines; a Dispensing Module, which evaluates a patient's compliance with a treatment regimen; and/or a Feedback and Patient Management Module, which gathers compliance information and evaluates efficacy of a treatment regimen for a patient. In embodiments of the subject invention, some or all of the modules described can communicate to manage a disease, medical condition, and/or health problem in a patient.

U.S. Patent Application 2012/0101630 to Daya et al. discloses a disease management system and therapeutic hub are provided. In certain embodiments, a dispensing apparatus used as part of a compliance monitoring system for the disease management system can function as a therapeutic hub that interacts with a plurality of peripheral devices to accumulate, communicate, and analyze a variety of medical and non-medical related data of the patient.

Although the aforementioned prior art have contributed to the development of the art of pharmaceutical containers, none of these prior art patents have solved the needs of this art.

Therefore, it is an object of the present invention to provide an improved pharmaceutical container for housing a fixed dose combination drug.

Another object of this invention is to provide an improved pharmaceutical container that is disposable.

Another object of this invention is to provide an improved pharmaceutical container that is easily opened to remove the fixed dose combination drug.

Another object of this invention is to provide an improved pharmaceutical container that is easily identifiable by an image or text imprinted on the container.

Another object of this invention is to provide an improved viewing port that is cost effective to produce.

The foregoing has outlined some of the more pertinent objects of the present invention. These objects should be construed as being merely illustrative of some of the more prominent features and applications of the invention. Many other beneficial results can be obtained by modifying the invention within the scope of the invention. Accordingly other objects in a full understanding of the invention may be had by referring to the summary of the invention, the detailed description describing the preferred embodiment in addition to the scope of the invention defined by the claims taken in conjunction with the accompanying drawings.

SUMMARY OF THE INVENTION

The present invention is defined by the appended claims with specific embodiments being shown in the attached drawings. For the purpose of summarizing the invention, the invention relates to a pharmaceutical container housing a substance for treating an individual having a medical condition. The pharmaceutical container includes a primary layer having an interior surface and an exterior surface. A secondary layer has an interior surface and an exterior surface. A pouch closure couples the primary layer and the secondary layer for defining a disposable pouch. The disposable pouch defines a pouch chamber between the primary layer and the secondary layer. A first pharmaceutical substance is within the pouch chamber of the disposable pouch. A second pharmaceutical substance is within the pouch chamber of the disposable pouch. The first pharmaceutical substance and the second pharmaceutical substance define a fixed-dose combination drug for ingestion by the individual for treating the medical condition.

In another embodiment of the invention, an image is on the disposable pouch. The image conveys the source of the medical condition within the individual. The image permits the rapid selection of the fixed-dose combination drug within the disposable pouch for treating the individual having the medical condition.

In another embodiment of the invention, a third pharmaceutical substance is within the disposable pouch for treating the medical condition. The first pharmaceutical substance includes aspirin. The second pharmaceutical substance is clopidogrel, effient or brilinta. The third pharmaceutical substance is atorvastatin or rosuvastatin. The first pharmaceutical substance, the second pharmaceutical substance and the third pharmaceutical substance define the fixed-dose combination drug for treating coronary artery disease.

In another embodiment of the invention, a third pharmaceutical substance is within the disposable pouch for treating the medical condition. The first pharmaceutical substance is ranitidine or famotidine. The second pharmaceutical substance includes diphenhydramine. The third pharmaceutical substance includes prednisone. The first pharmaceutical substance, the second pharmaceutical substance and the third pharmaceutical substance define the fixed-dose combination drug for treating an allergic reaction.

In another embodiment of the invention, the primary layer includes a lidding seal panel and the secondary layer includes a deformable bulbous panel. The lidding seal panel and the deformable bulbous panel define a push through pack or blister pack for permitting a force upon the deformable bulbous panel to collapse the deformable bulbous panel and compress the first pharmaceutical substance and the second pharmaceutical substance against the lidding seal panel and to pierce the lidding seal panel with the first pharmaceutical substance and said second pharmaceutical substance to remove said first pharmaceutical substance and the second pharmaceutical substance from the push through pack or blister pack.

The invention is also incorporated into the method of treating an individual having a medical condition. The method comprises the steps of disengaging a pouch closure in a disposable pouch for defining a pouch aperture. A first pharmaceutical substance is removed from the disposable pouch through the pouch aperture. A second pharmaceutical substance is removed from the disposable pouch through the pouch aperture. The first pharmaceutical substance and the second pharmaceutical substance are ingested for treating the individual having the medical condition by a fixed-dose combination drug.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which.

Similar reference characters refer to similar parts throughout the several Figures of the drawings.

DETAILED DISCUSSION

Figure 1:
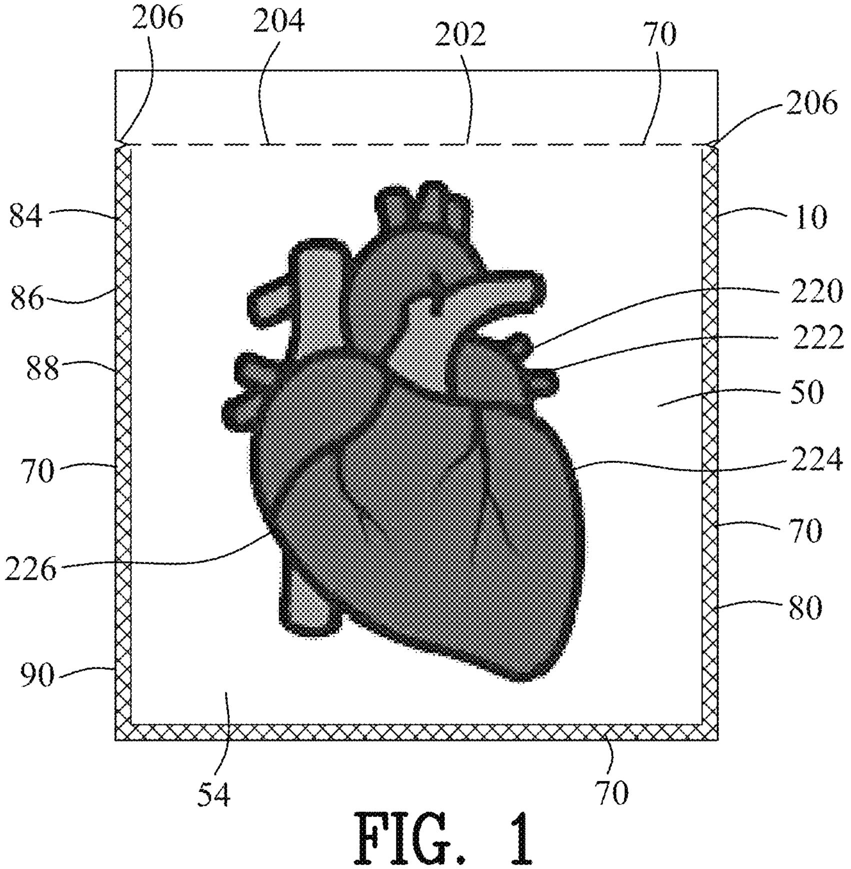
FIG. 1 is a front view of a first embodiment for a pharmaceutical container for housing a first fixed dose combination drug for treating a heart condition.
Figure 2:
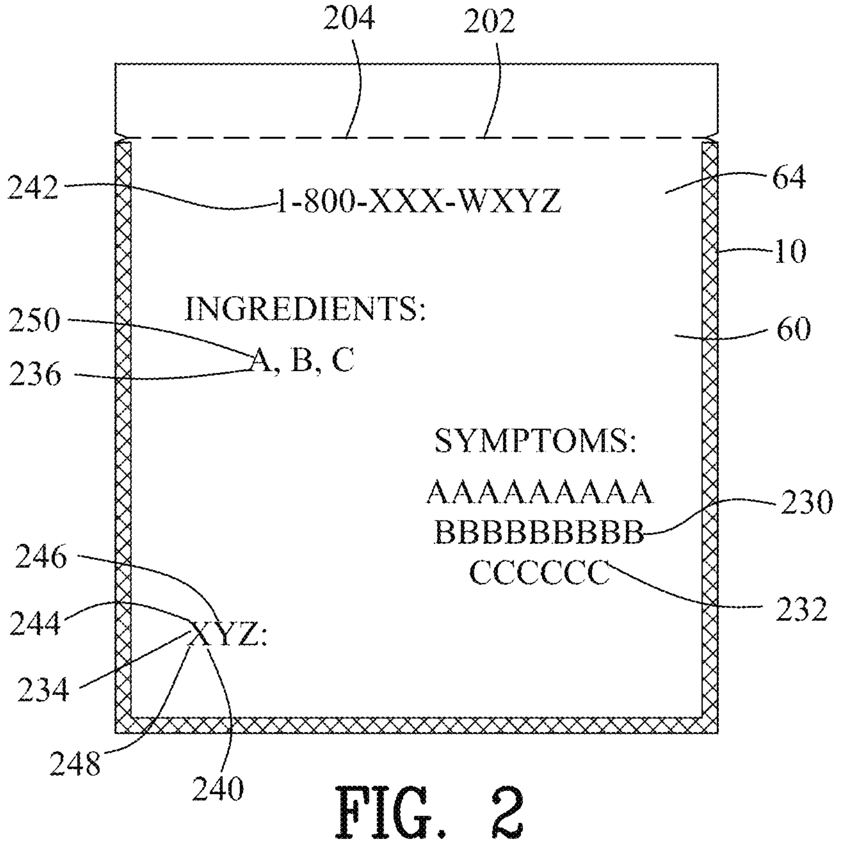
FIG. 2 is a rear view of FIG. 1.
Figure 3:
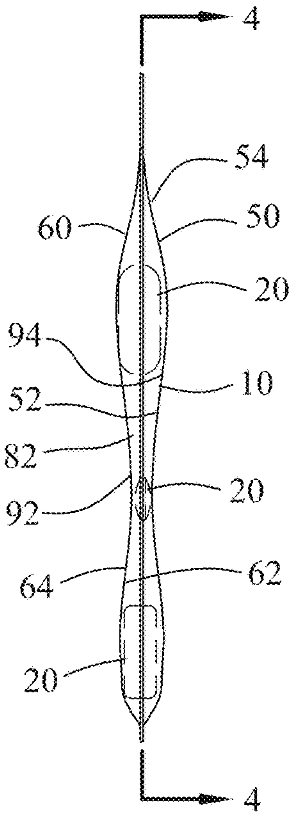
FIG. 3 is a left side view of FIG. 1.
Figure 4:
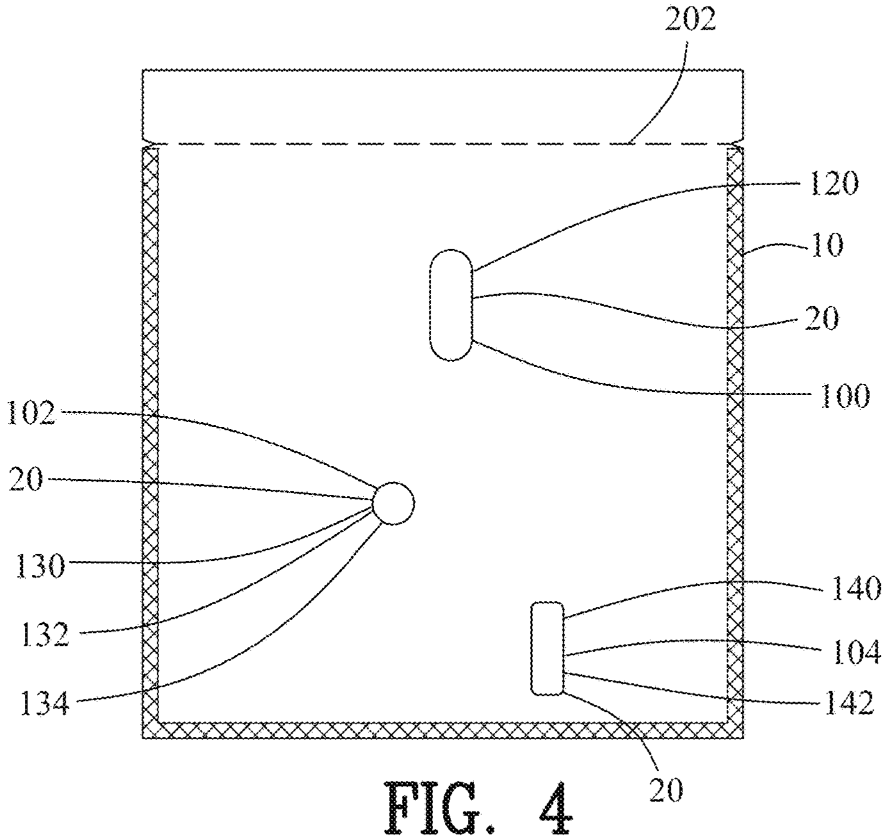
FIG. 4 is a sectional view along line 4-4 in FIG. 3 illustrating the first fixed dose combination drug.
Figure 5:
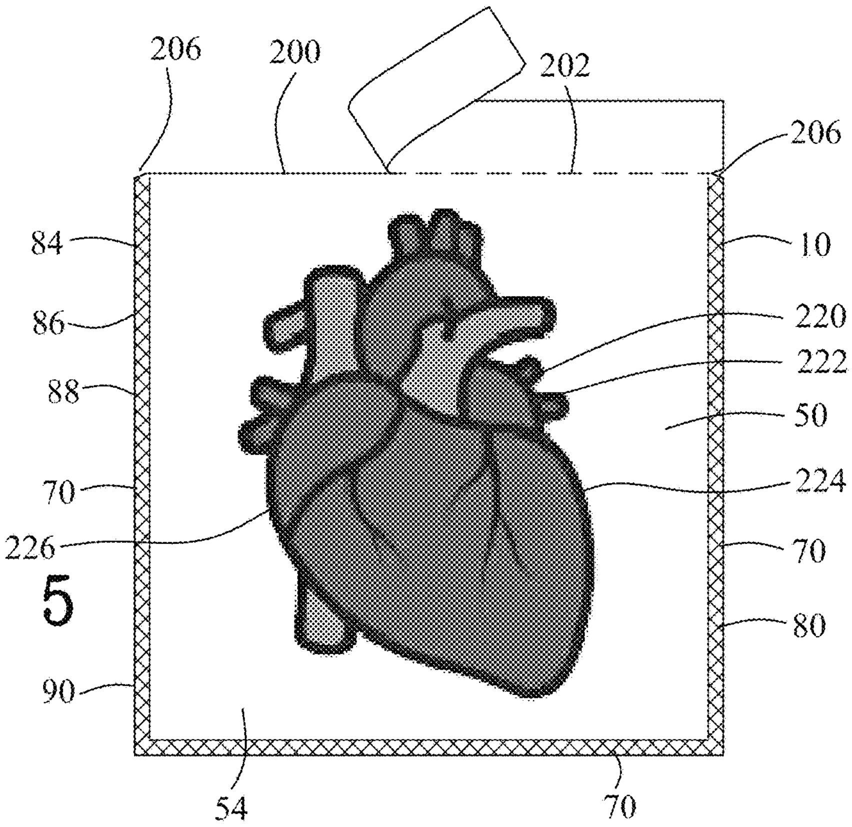
FIG. 5 is a view similar to FIG. 1 illustrating the disposable pouch being opened along a perforation for creating a pouch aperture in the disposable pouch.
Figure 6:
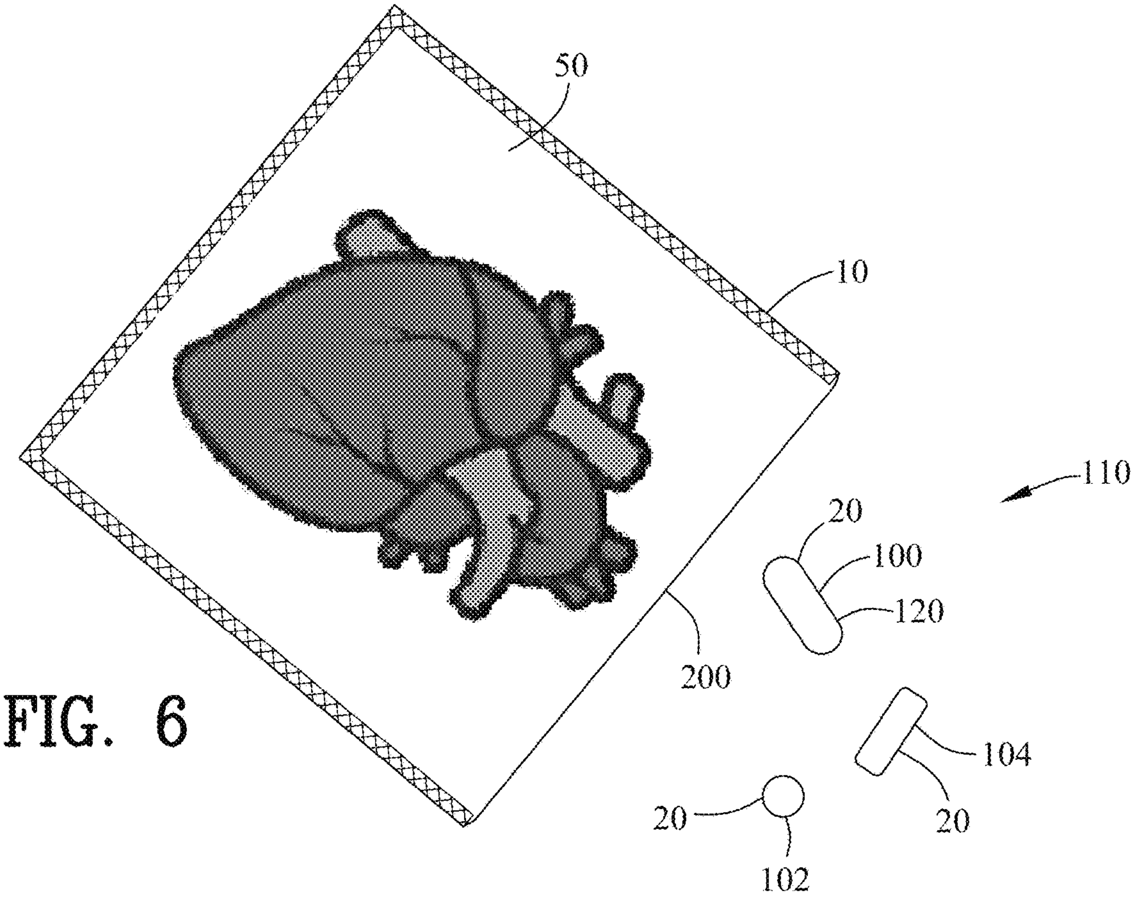
FIG. 6 is a view similar to FIG. 5 illustrating the first fixed dose combination drug being removed from the disposable pouch.
Figure 7:
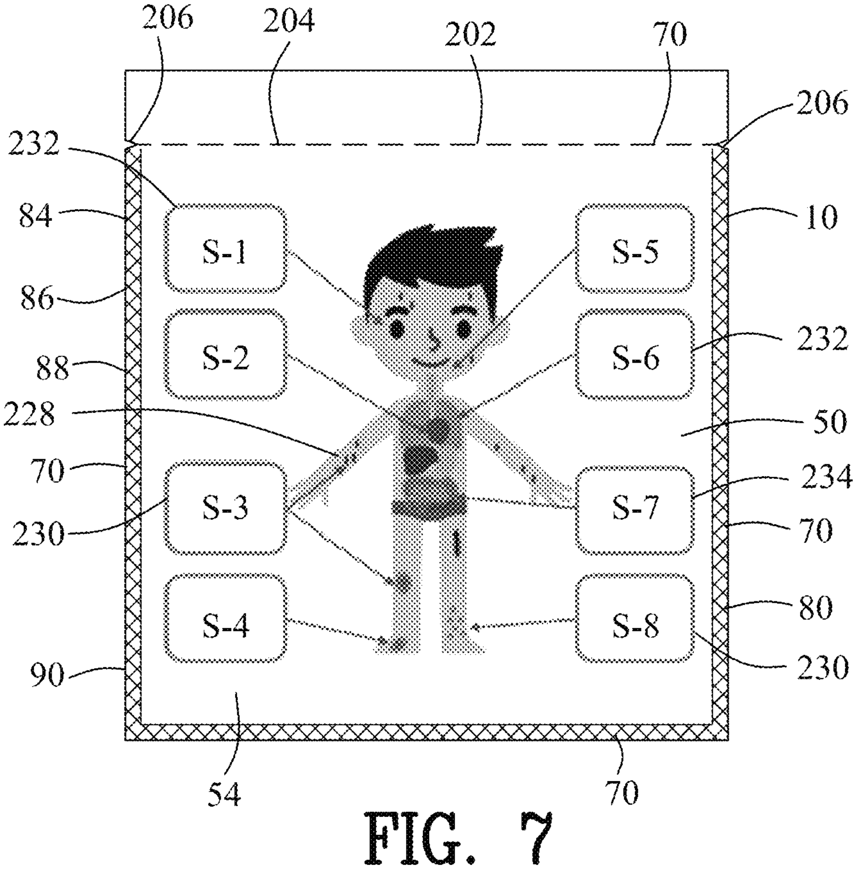
FIG. 7 is a front view of a second embodiment for the pharmaceutical container for housing a second fixed dose combination drug for treating an allergic condition.
Figure 8:
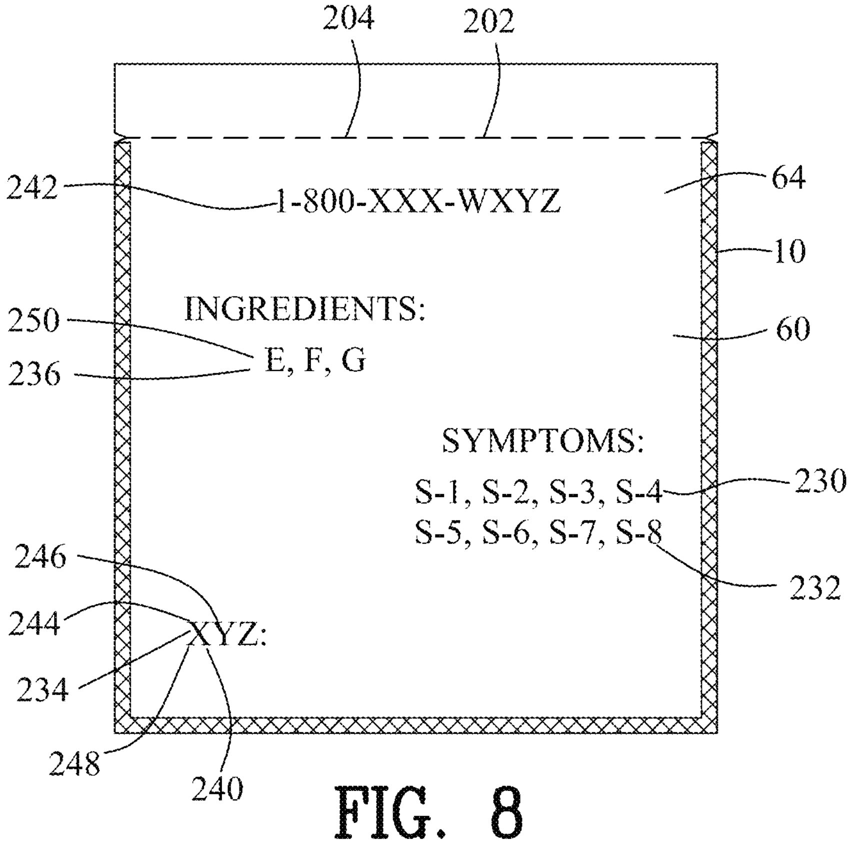
FIG. 8 is a rear view of FIG. 7.
Figure 9:
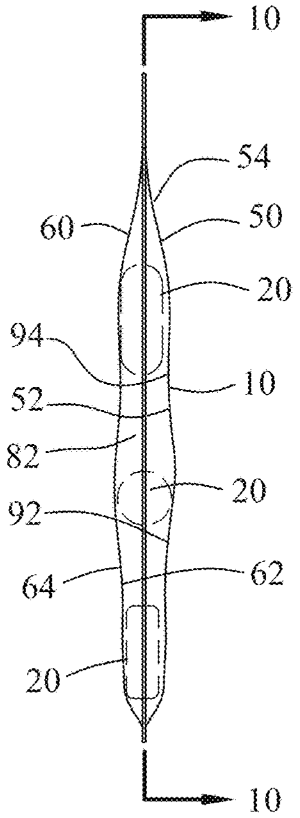
FIG. 9 is a left side view of FIG. 7.
Figure 10:
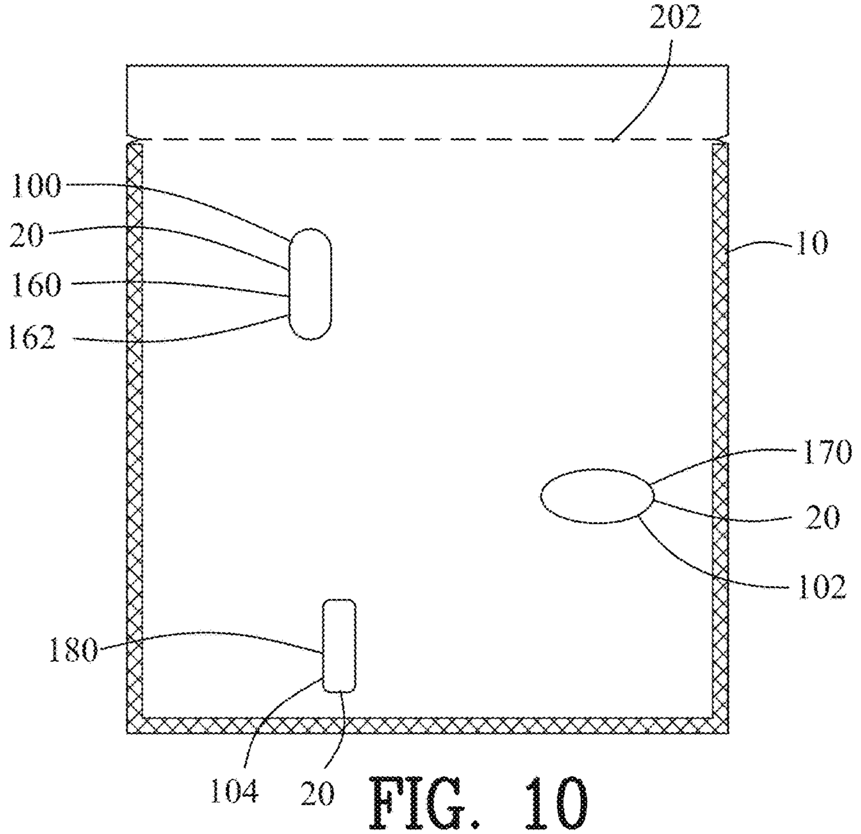
FIG. 10 is a sectional view along line 10-10 in FIG. 9 illustrating the second fixed dose combination drug.
Figure 11:
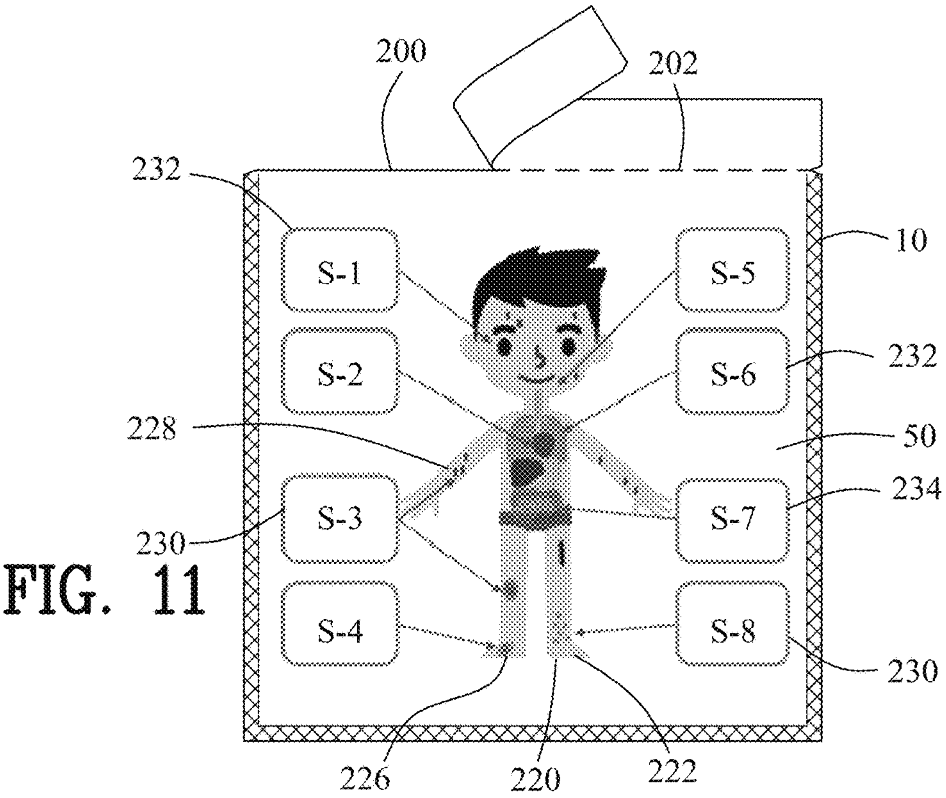
FIG. 11 is a view similar to FIG. 7 illustrating the disposable pouch being opened along a perforation for creating a pouch aperture in the disposable pouch.
Figure 12:
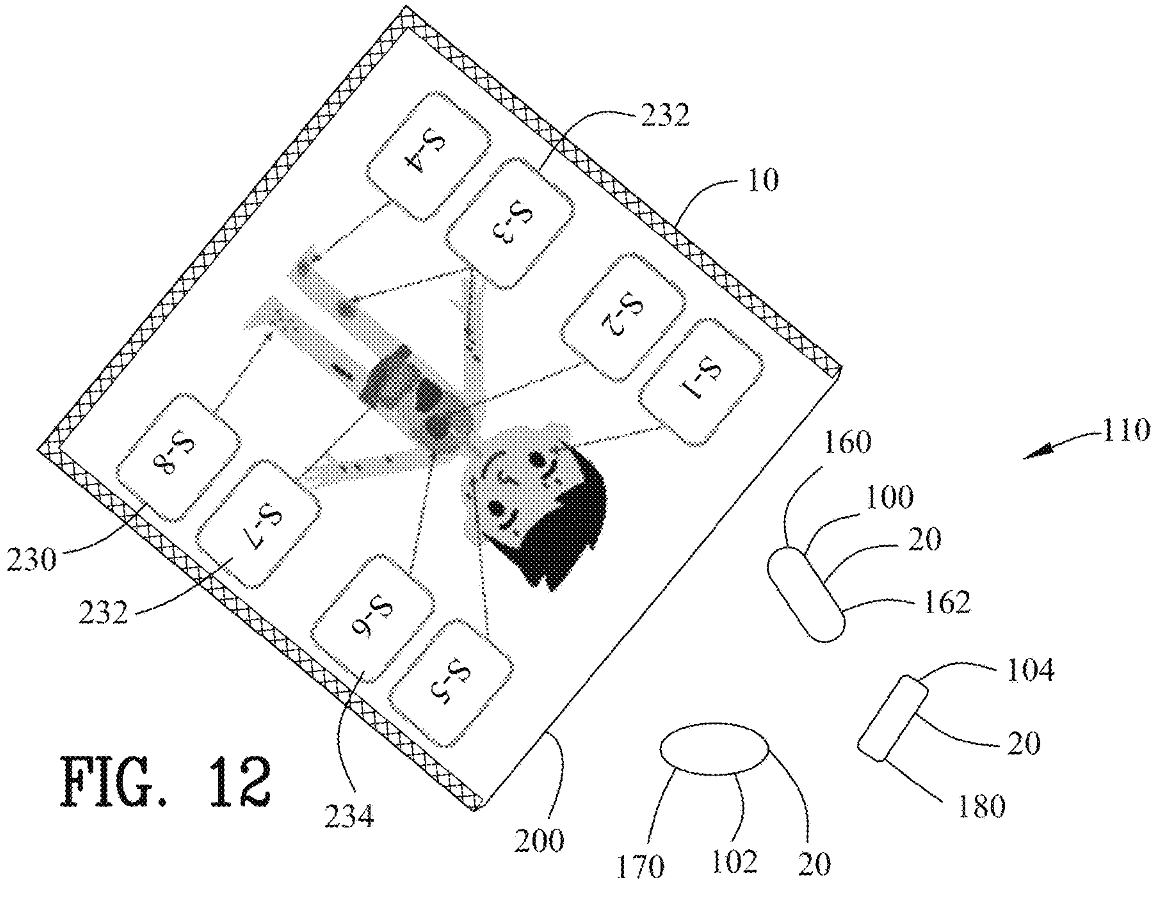
FIG. 12 is a view similar to FIG. 11 illustrating the second fixed dose combination drug being removed from the disposable pouch.
Figure 13:
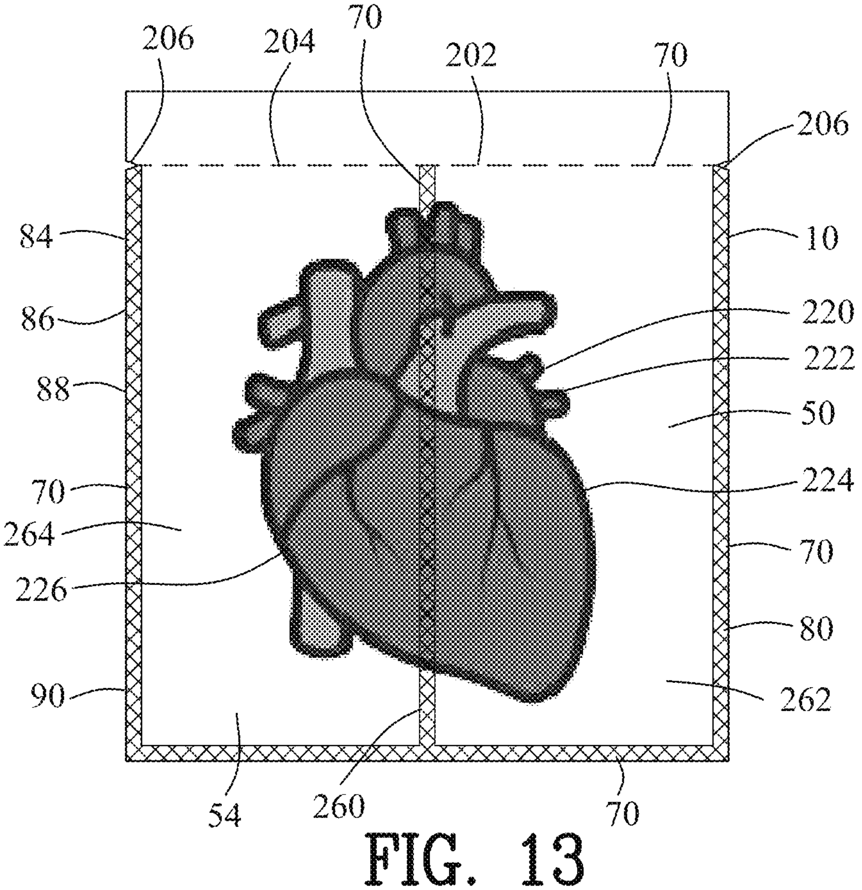
FIG. 13 is a front view of a third embodiment for the pharmaceutical container for housing a first fixed dose combination drug in a primary pouch chamber and a pharmaceutical substance in a secondary pouch chamber for treating a heart condition.
Figure 14:
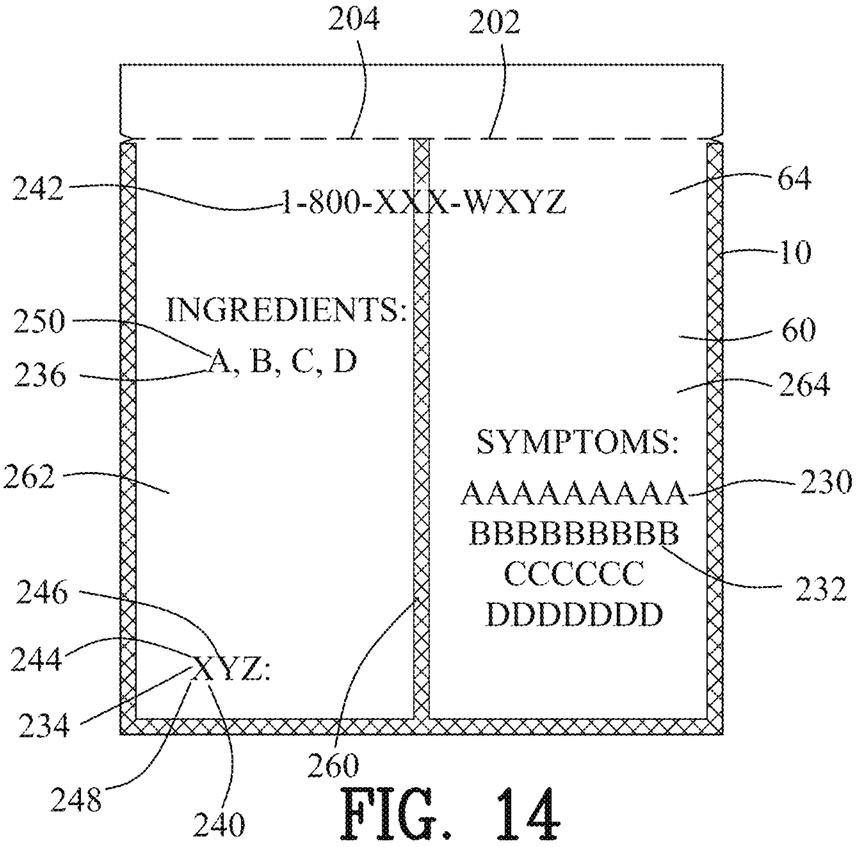
FIG. 14 is a rear view of FIG. 13.
Figure 15:
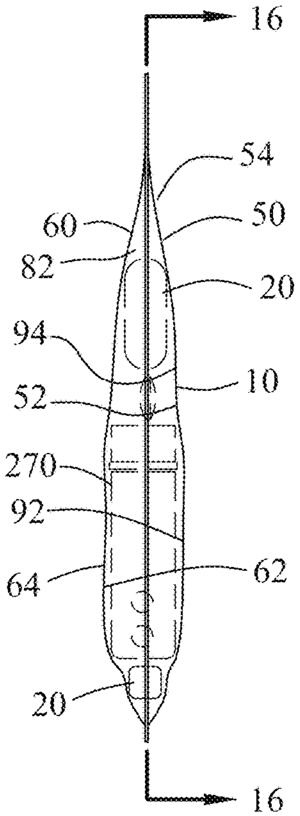
FIG. 15 is a left side view of FIG. 13.
Figure 16:
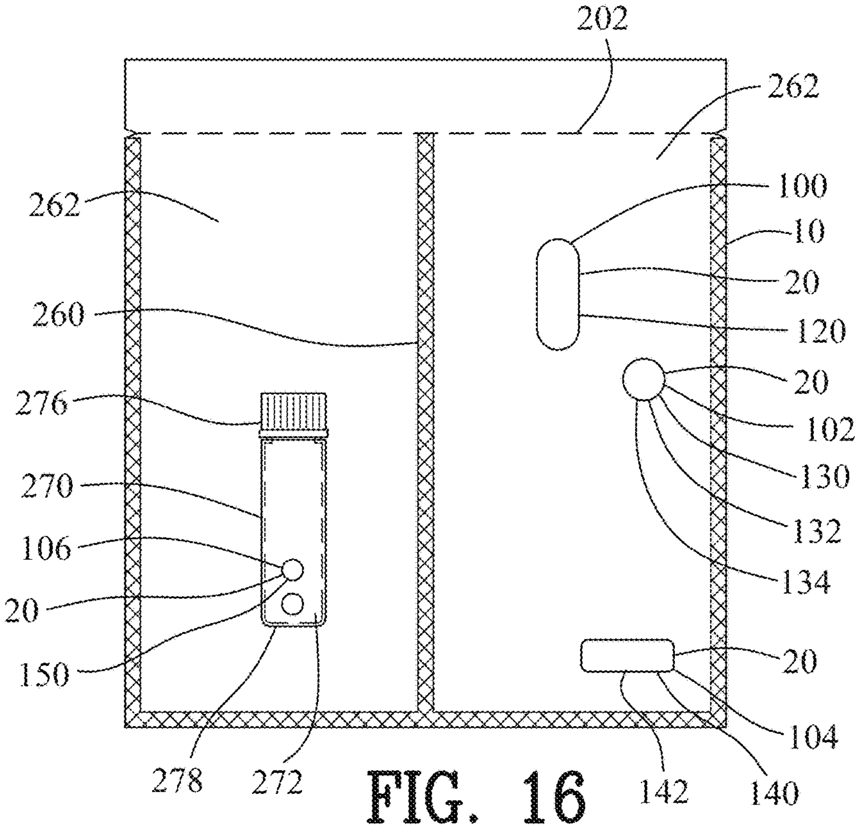
FIG. 16 is a sectional view along line 16-16 in FIG. 15 illustrating the first fixed dose combination drug in a primary pouch chamber and a pharmaceutical substance in a secondary pouch chamber.
Figure 17:
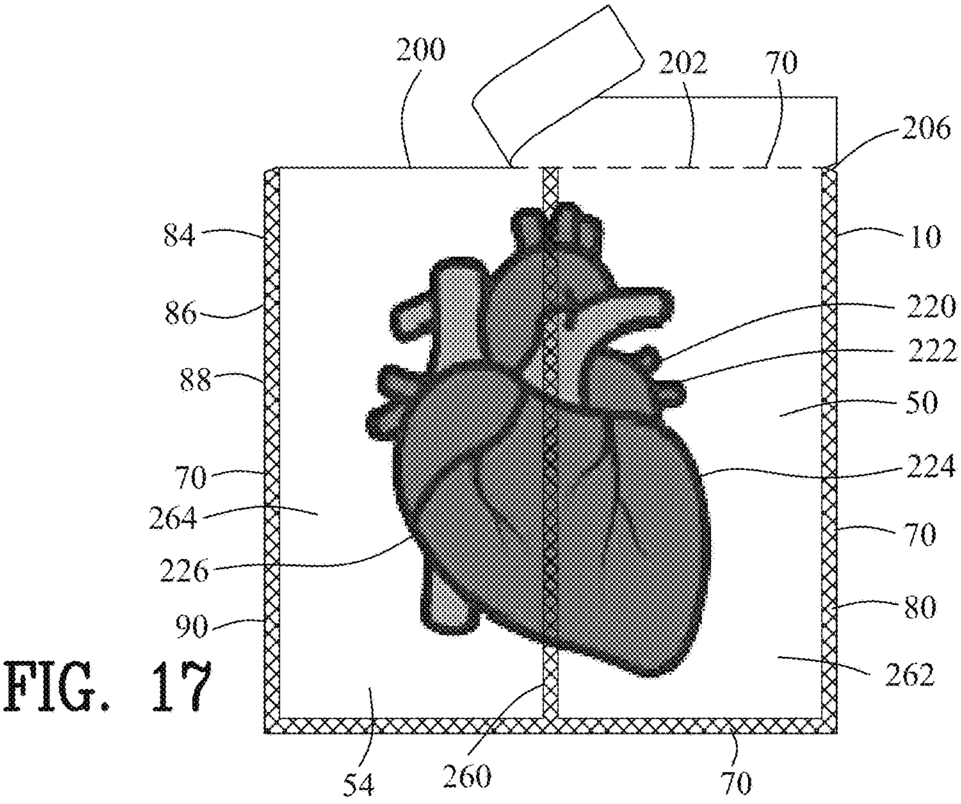
FIG. 17 is a view similar to FIG. 13 illustrating the disposable pouch being opened along a perforation for creating a primary pouch aperture in the primary pouch chamber and a secondary pouch aperture in the secondary pouch chamber.
Figure 18:
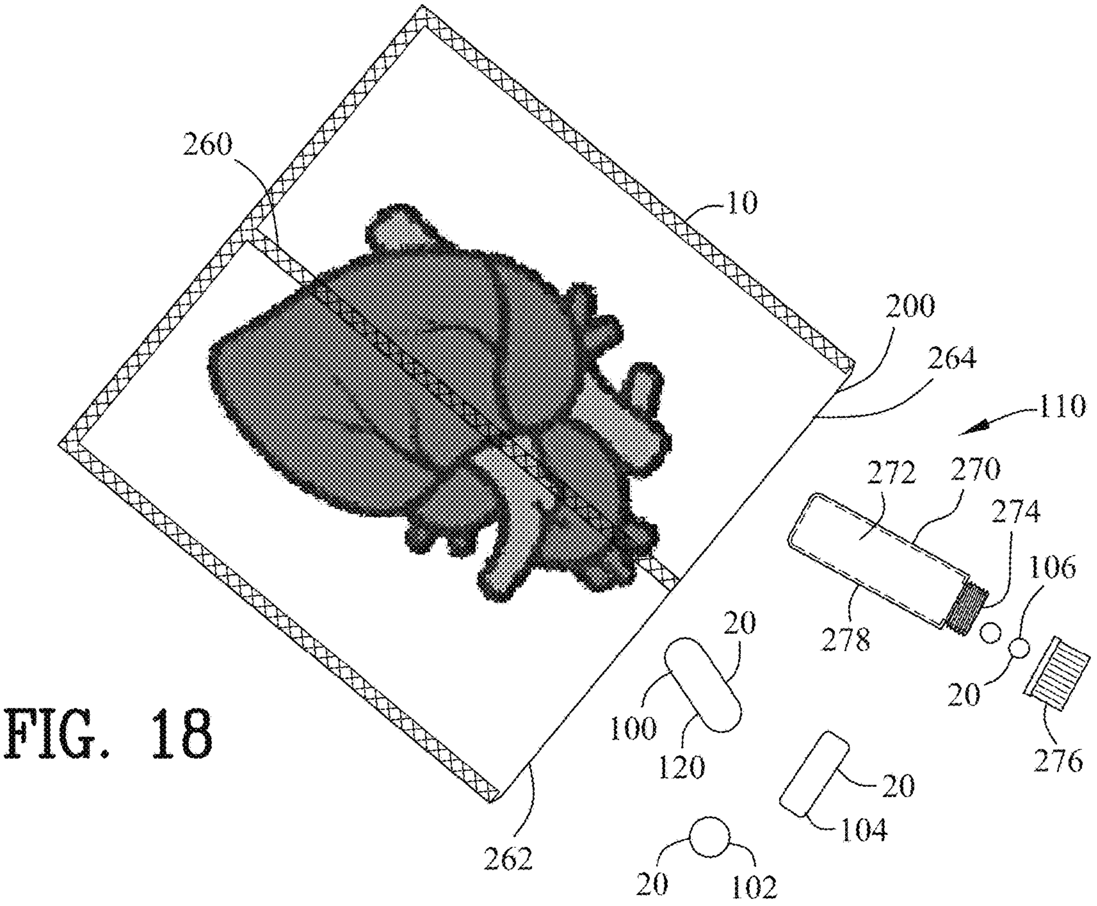
FIG. 18 is a view similar to FIG. 17 illustrating the first fixed dose combination drug being removed from the primary pouch aperture and the pharmaceutical substance from the secondary pouch aperture.

FIGS. 1-30 illustrate a pharmaceutical container 10 housing a substance 20. FIG. 20 illustrates an individual 12 having a medical condition 30 and receiving the substance 20 for treating the medical condition 30. The pharmaceutical container 10 includes a primary layer 50 having an interior surface 52 and an exterior surface 54. A secondary layer 60 has an interior surface 62 and an exterior surface 64.

A pouch closure 70 couples the primary layer 50 and the secondary layer 60 for defining a disposable pouch 80. The disposable pouch 80 defines a pouch chamber 82 between the primary layer 50 and the secondary layer 60.

A first pharmaceutical substance 100 is within the pouch chamber 82 of the disposable pouch 80. A second pharmaceutical substance 102 is within the pouch chamber 82 of the disposable pouch 80. The first pharmaceutical substance 100 and the second pharmaceutical substance 82 define a fixed-dose combination drug 110 for ingestion by the individual 12 for treating the medical condition 30.

The disposable pouch 80 may be constructed of a material selected from the group consisting of high density polyethylene (HDPE) 84, low density polyethylene (LDPE) 86 and linear low-density polyethylene (LLDPE) 88. The pouch closure 70 may include heat fusing the edges of the primary layer 50 and the secondary layer 60 together. Alternatively, the primary layer 50 and the secondary layer 60 may be an integral one-piece layer wherein the pouch closure 70 may be located on either the primary layer 50, the secondary layer 60 or common to both primary layer 50 and the secondary layer 60 at a common edge.

Alternatively, the disposable pouch 80 may be constructed of a natural fiber 90. The pouch closure 70 may include gluing the edges of the primary layer 50 and the secondary layer 60 together. Alternatively, the primary layer 50 and the secondary layer 60 may be an integral one-piece layer wherein the pouch closure 70 may be located on either the primary layer 50, the secondary layer 60 or common to both primary layer 50 and the secondary layer 60 at a common edge. An inner liner 92 may be coupled to the interior surface 52 of the primary layer 50 and the interior surface 62 of the secondary layer 60 for providing a protective barrier 94. The inner liner 92 is a material selected from the group consisting of high density polyethylene (HDPE), low density polyethylene (LDPE) and linear low-density polyethylene (LLDPE). Alternatively, the inner liner 92 may be a metallic material such as aluminum. The protective barrier 94 protects the fixed dose combination drug 110 from moisture, heat and or light.

A perforation 202 may be on the disposable pouch 80 for assisting in creating a pouch aperture 200 in the disposable pouch 80 and removing the fixed-dose combination drug 110 from the disposable pouch 80. The perforation 202 may be located on the primary layer 50, the secondary layer 60 or common to both primary layer 50 and the secondary layer 60 at a common edge.

Alternatively, a flexible zipper closure 204 may be on the disposable pouch 80 for assisting in creating the pouch aperture 200 in the disposable pouch 80 and removing the fixed-dose combination drug 110 from the disposable pouch 80. The flexible zipper closure 204 may be located on the primary layer 50, the secondary layer 60 or common to both primary layer 50 and the secondary layer 60 at a common edge.

Alternatively, a tear notch 206 may be on the disposable pouch 80 for assisting in creating a pouch aperture 200 in the disposable pouch 80 and removing the fixed-dose combination drug 110 from the disposable pouch 80. Preferably, the tear notch 206 is located adjacent to the edge of the primary layer 50 and the secondary layer 60.

An image 220 may be positioned on the disposable pouch 80. The image 220 conveys the source 222 of the medical condition 30 within the individual 12. The image 220 permits the rapid selection of the fixed-dose combination drug 110 within the disposable pouch 80 for treating the individual 12 having the medical condition 30. For example as shown in FIGS. 1, 5, 6, 13 and 17-20, the image 220 includes a picture of a human heart 224. The picture of a human heart 224 would designate the individual 12 having a medical condition 30 with regard to the individual's heart. More specifically, the picture of the human heart 222 would designate the medical condition 30 including coronary artery disease 32 resulting in a possible a heart attack.

Alternatively, FIGS. 7, 11, 12 and 19 the image 220 includes a picture of a human having an allergic reaction 228. The human having an allergic reaction 228 would designate the individual 12 having a medical condition 30 with regard to the individual being exposed to an allergen. More specifically, the image 220 of the human having an allergic reaction 228 may include itchy red spots on the skin, hives and or swelling. The allergic reaction 228 would designate the medical condition 30 including an allergic reaction 228 due to the body's immune system overreacting to an allergen.

The image 220 may convey the individual's 12 symptom 226 due to the medical condition 30 experienced by the individual 12. The image 220 permits the rapid selection of the fixed-dose combination drug 110 within the disposable pouch 80 for treating the individual 12 having the medical condition 30. For example as shown in FIGS. 1, 5, 6, 13 and 17-20, the image 220 includes a picture of a human heart 224 along with additional artwork or symbols indicating symptoms of a heart attack. More specifically, the additional artwork or symbols may images illustrating pressure, tightness, pain in the chest or the arms of the individual. Additional artwork or symbols could illustrate shortness of breath, nausea, cold sweats, fatigue or lightheadedness or dizziness. The image 220 of the symptom(s) 226 would designate the individual 12 having a medical condition 30 with regard to the individual's heart. More specifically, the image 220 including artwork or symbols would designate the medical condition 30 including coronary artery disease 32 resulting in a possible a heart attack.

Alternatively, FIGS. 7, 11, 12 and 19, the image 220 includes a picture of a human along with additional artwork or symbols indicating symptoms of an allergic reaction. More specifically, the additional artwork or symbols may images illustrating itchy red spots on the skin, hives and or swelling of the individual. The image 220 of the symptom(s) 226 would designate the individual 12 having a medical condition 30 with regard to the individual's immune system. More specifically, the image 220 including artwork or symbols would designate the medical condition 30 including coronary artery disease 32 resulting in a possible a heart attack.

A text 230 may be placed on the disposable pouch 80. The text 230 conveys the individual's symptom 232 due to the medical condition 30 within the individual 12. The text 230 permits the rapid selection of the fixed-dose combination drug 110 within the disposable pouch 80 for treating the individual 12 having the medical condition 30. For example as shown in FIGS. 2, 7, 8, 11, 12, and 14, the text 230 may include text of symptom(s) such as Unstable Angina/Non ST segment Elevated Myocardial Infarction (NSTEMOI)/ST segment elevation myocardial infarction (STEMI-Acute heart attack)/ANGINA-Chest pain due to blockage of coronary artery in patients with history of coronary artery disease or in DENOVO (Newly formed blockages/clots in the coronary arteries). The text 230 of the symptom(s) 232 would designate the individual 12 having a medical condition 30 with regard to the individual's heart. More specifically, the text 230 would designate the medical condition 30 includes coronary artery disease 32 resulting in a possible a heart attack.

The text 230 on the disposable pouch 80 may further convey the source 234 of the individual's symptom 232 due to the medical condition 30. The text 230 permits the rapid selection of the fixed-dose combination drug 110 within the disposable pouch 80 for treating the individual 12 having the medical condition 30. For example as shown in FIGS. 2, 7, 8, 11, 12, and 14, the text 230 may include text of source(s) such as "heart saver pouch" or "allergy saver pouch". The text 230 of the source(s) 234 would designate the individual 12 having a medical condition 30 with regard to the individual's heart. More specifically, the text 230 would designate the medical condition 30 includes coronary artery disease 32 resulting in a possible a heart attack.

The text 230 on the disposable pouch 80 may include a list 236 of all pharmaceutical substances within the disposable pouch 80. More specially, the list 236 may include the first pharmaceutical substance 100 and the second pharmaceutical substance 102. The text 230 permits the rapid selection of the fixed-dose combination drug 110 within the disposable pouch 80 for treating the individual 12 having the medical condition 30.

The text 230 on the disposable pouch 80 may include a listing of information 240 selected from the group consisting of telephone numbers for emergency services 242, hospitals 244 and physicians 246 and instructions 248 for further first aid to be applied to the individual.

The text 230 on the disposable pouch 80 may include a listing of weight 250 of the first pharmaceutical substance 100 and the second pharmaceutical substance 102.

As shown in FIGS. 1-6, 19 and 20, the pharmaceutical container 10 may include a third pharmaceutical substance 104 within the disposable pouch 80 for treating the medical condition 30. The first pharmaceutical substance 100 includes aspirin 120. The second pharmaceutical substance 102 is clopidogrel 130, effient 132 or brilinta 134. The third pharmaceutical substance 104 is atorvastatin 140 or rosuvastatin 142. The first pharmaceutical substance 100, the second pharmaceutical substance 102 and the third pharmaceutical substance 104 define the fixed-dose combination drug 110 for treating coronary artery disease 32. The weight of each substances may include aspirin: 81 mg/75 mg/325 mg, clopidogrel: 75 mg/300 mg/600 mg, effient 10 mg/60 mg or brilinta: 90 mg/180 mg, atorvastatin 20 mg/40 mg/80 mg or rosuvastatin 20 mg/40 mg/80 mg.

In another embedment of the invention as shown in FIGS. 13-18, the disposable pouch 80 may include a pouch partition 260 for defining a primary pouch chamber 262 and a second pouch chamber 264. The fixed-dose combination drug 110 is positioned within the primary pouch chamber 262. A glass container 270 defines a container chamber 272 and a container aperture 274. A container cap 276 engages the glass container 270 for sealing the container aperture 274. An opaque layer 278 is coupled to the glass container 270 for preventing exposure of the container chamber 272 to light.

A fourth pharmaceutical substance 106 is within the glass container 270 for treating the medical condition 30. The forth pharmaceutical substance 106 includes nitroglycerin 150. Preferably, the nitroglycerin 150 is positioned underneath the tongue of the individual after the individual has ingested the first pharmaceutical substance 100, the second pharmaceutical substance 102 and the third pharmaceutical substance 104.

The glass container 270 is positioned within the secondary pouch chamber 264. The first pharmaceutical substance 100, the second pharmaceutical substance 102, the third pharmaceutical substance 104 and the fourth pharmaceutical substance 106 define the fixed-dose combination drug 110 for treating coronary artery disease 32.

In patients with coronary artery disease that is blockage of the arteries that supply the heart, usually, 3 medications are given in the emergency room when the patient complains of chest pain due to blockage. Those 3 medications include aspirin, cholesterol medications (statins) along with blood thinners which are taken by mouth like clopidogrel or prasugrel or ticagrelor along with Nitroglycerin and Heparin. However, there is delay in administration of treatment/medications from the time the patient is picked up by the emergency medical services until the time the patient reaches the hospital. If there is a time delay, in administration of medications until the patient is seen by the emergency room physician, there is damage to the heart muscle which may be permanent. The pharmaceutical container 10 may solve this problem by providing all the medications which are given in the emergency room can be taken by the patient are administered by the family members if they are readily available in a single dose sachet form. More specifically, the pharmaceutical container 10 may be utilized by the patient at the first signs of medical condition and before the arrival of mobile medical services and before the patient reaches a medical facility. The sachet/pouch/pillbox will contain one tablet each of aspirin, statin (either atorvastatin or rosuvastatin in variable milligrams) and clopidogrel or prasugrel or ticagrelor (various dosages and strengths) prescribed/determined by the physician. This sachet/pouch/pillbox will also include nitroglycerin tablet in future and it will be in separate containers so as to prevent the exposure to light and Decay. The pharmaceutical container 10 may further include nitroglycerin tablet. All the medications mentioned above are FDA approved, and used in patients with coronary artery disease and are available as individual prescriptions in the United States as well as in Europe. The pharmaceutical container 10 provides taking all the 3 medications available due to the patients in their home to be used as needed in case of emergencies.

In the sachet we will include the emergency services numbers handy and will also have 1-800 number that will be connecting to local emergency services (this will be useful in countries where there is no EMS services available) and there will also be downloadable app which will be connecting to the emergency services and will have listings of hospitals and physicians.

As shown in FIGS. 7-12, 19 and 20, the pharmaceutical container 10 may include a third pharmaceutical substance 104 within the disposable pouch 80 for treating the medical condition 30. The first pharmaceutical substance 100 is ranitidine 160 or famotidine 162. The second pharmaceutical substance 102 includes diphenhydramine 170. The third pharmaceutical substance 104 includes prednisone 180. The first pharmaceutical substance 100, the second pharmaceutical substance 102 and the third pharmaceutical substance 104 define the fixed-dose combination drug 110 for treating an allergic reaction 34. The weight of each substance may include ranitidine 75 mg/150 mg or famotidine 20 mg/40 mg, diphenhydramine 25 mg/50 mg/75 mg/100 mg, prednisone 10 mg/20 mg/30 mg/40 mg 50 mg/60 mg/70 mg/80 mg 90 mg/100 mg/110 mg/120 mg 125 mg/200 mg/250 mg.

A text 230 may be placed on the disposable pouch 80. The text 230 conveys the individual's symptom 232 due to the medical condition 30 within the individual 12. The text 230 permits the rapid selection of the fixed-dose combination drug 110 within the disposable pouch 80 for treating the individual 12 having the medical condition 30. For example as shown in 7-12, 19 and 20, the text 230 may include text of symptom(s) such as angioedemaStridor (SWELLING OF THROAT AND ANAPHYLACTIC REACTION (HYPOTENSION, TACHYCARDIA AND SYNCOPE), cough and wheeze difficulty breathing, vomiting, diarrhea, urticaria maculopapular rash, facial swelling, tachycardia hypotension, target lesions blistering epidermal detachment, pustules purpura necrotic lesions.

The text 230 of the symptom(s) 232 would designate the individual 12 having a medical condition 30 with regard to an allergic reaction 34. The text 230 on the disposable pouch 80 may further convey the source 234 of the individual's symptom 232 due to the medical condition 30 such as ALLERGIC REACTIONS TO FOOD, METALS, CONTACT ALLERGIES, HIVES, BEE STINGS, (MILD, MODERATE ALLERGIC REACTIONS)

In patients who have allergies either to food, pollen, dust, fur, bee stings, contact allergies, external allergies, metals, when exposed to these particular allergens, developed reactions ranging from mild symptoms of flu, hay fever, moderate symptoms like hives, severe symptoms like angioedema, hypotension, anaphylactic shock. These patients have to wait at home until the first responders arrive. Even though these patients have ranitidine (Pepcid), diphenhydramine (Benadryl), prednisone available at home, they are not handy and not available in a single sachet or pouch. These can be life-threatening emergencies and innumerable patients will benefit if these medications are available immediately and in a single sachet and the patients can take it before the emergency medical services arrive. These sachets can be kept in the car or in their wallets so that the available 24 hours by packaging all the 3 necessary medications, in one sachet/pouch. The pharmaceutical container 10 may assists in preventing multiple visits to emergencies thereby reducing the cost of expensive emergency room visits and decrease the burden on the emergency medical services. These medications will be available in different dosages and will be prescribed by the physician depending on patient's history. The pharmaceutical container 10 may further include cetirizine, loratadine in the sachets. The pharmaceutical container 10 may further include ALLERGY SAVER KITS in addition to ALLERGY SAVER Sachets/pouches. The ALLERGY SAVER KITS will include hydrocortisone cream, to be applied to the skin, on hives, and will also include epinephrine injection along with ALLERGYSAVER Sachets.

The pharmaceutical container 10 may include emergency services numbers handy and will also have 1-800 number that will be connecting to local emergency services (this will be useful in countries where there is no EMS services available) and there will also be downloadable app which will be connecting to the emergency services and will have listings of hospitals and physicians.

The disposable punch 80 may also include a fixed-dose combination drug 110 for an individual having a medical condition include an overdose of medication. The first pharmaceutical substance 100 may include activated charcoal, the second pharmaceutical substance 102 may include Opiod—Nalaxone and the third pharmaceutical substance 103 may include Benzo—Flumazenil.

The text 230 of the symptom(s) 232 would designate the individual 12 having a medical condition 30 with regard to an overdose of medication. The text 230 on the disposable pouch 80 may further convey the source 234 of the individual's symptom 232 due to the medical condition 30 such as ACUTE BENZO, OPIOD, INGESTION/TOXICITY/POISONING. The text may further include PULSEOXIMETER, BP CUFF, POISON CONTROL/911/SOURCES ON THE CARD, CONNECT TO THE APP.

Figure 19:
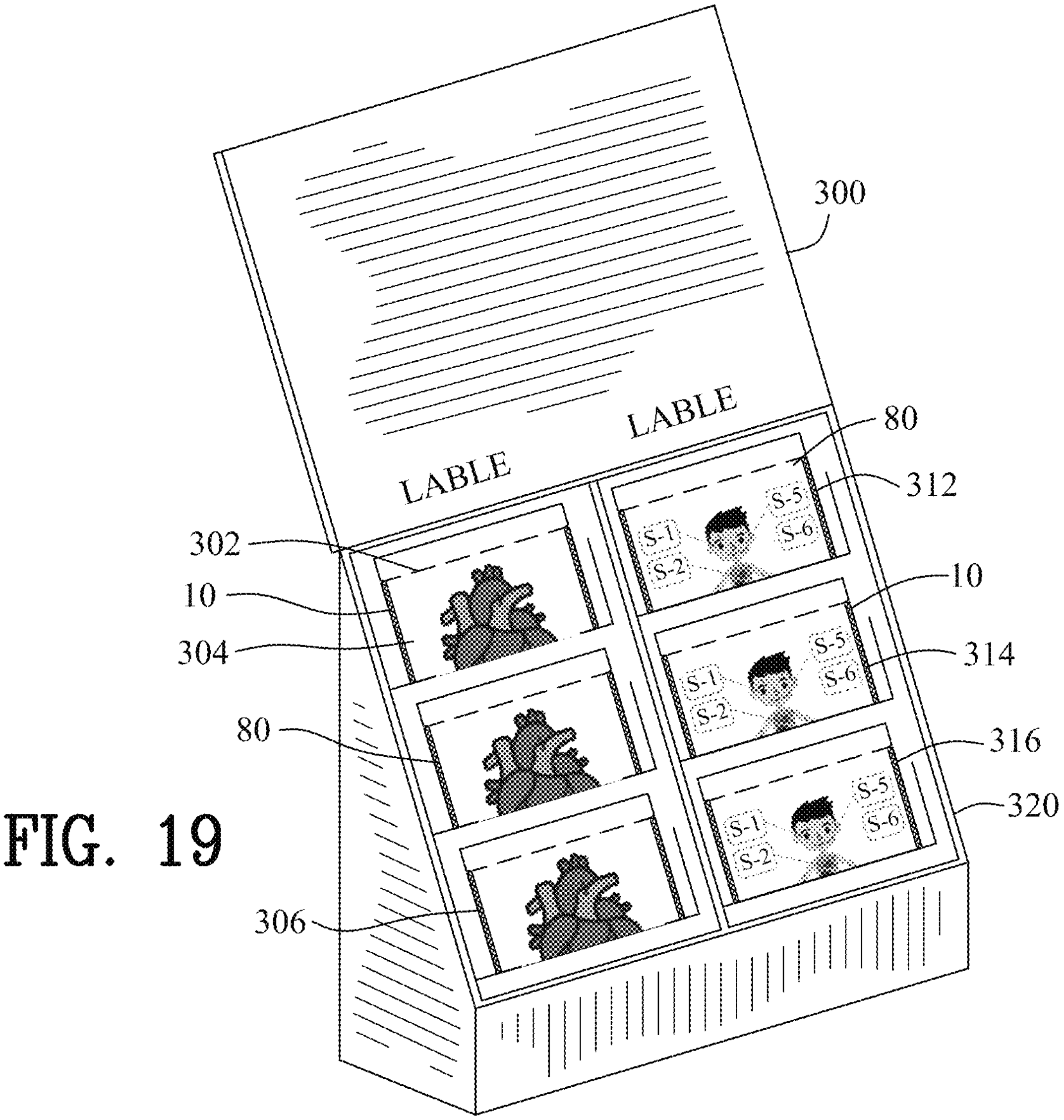
FIG. 19 is a fourth embodiment of the present invention of a pharmaceutical kit including first disposable pouch having a first fixed dose combination drug for treating a first medical condition and a second disposable pouch having a second fixed dose combination drug for treating a second medical condition.
Figure 20:
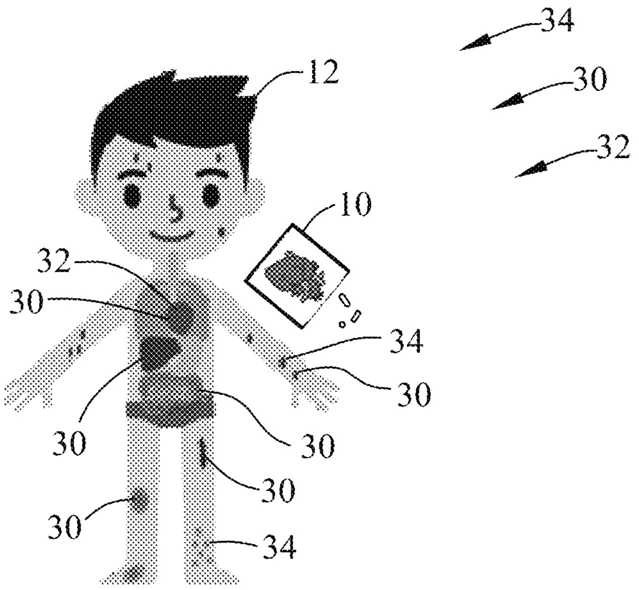
FIG. 20 is a front view of an individual having a medical condition and receiving the fixed dose combination drug.
Figure 21:
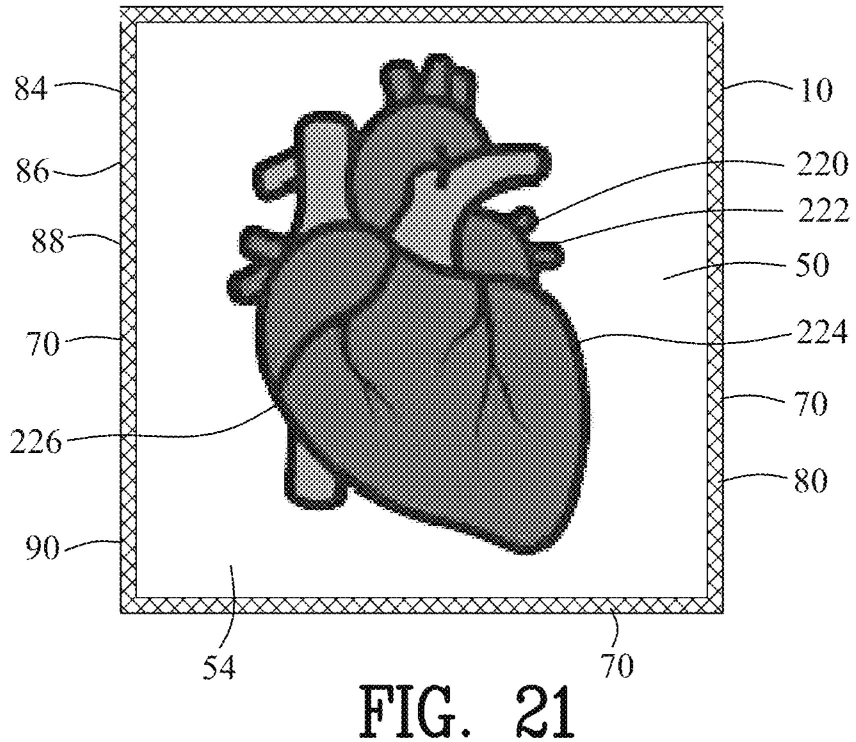
FIG. 21 is a front view of a fourth embodiment for a pharmaceutical container for housing a first fixed dose combination drug for treating a heart condition.
Figure 22:
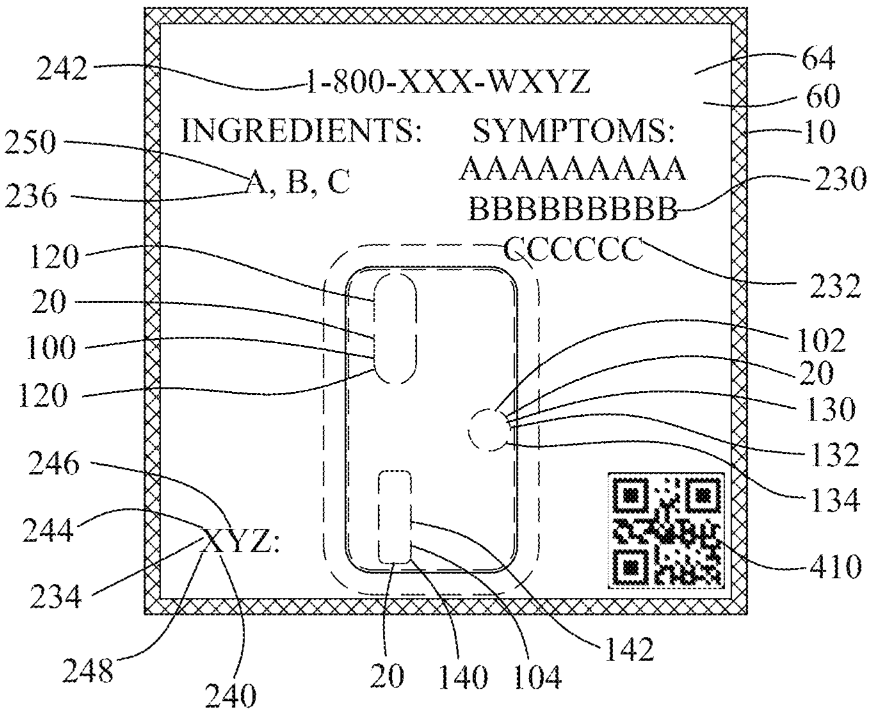
FIG. 22 is a rear view of FIG. 21.
Figure 23:
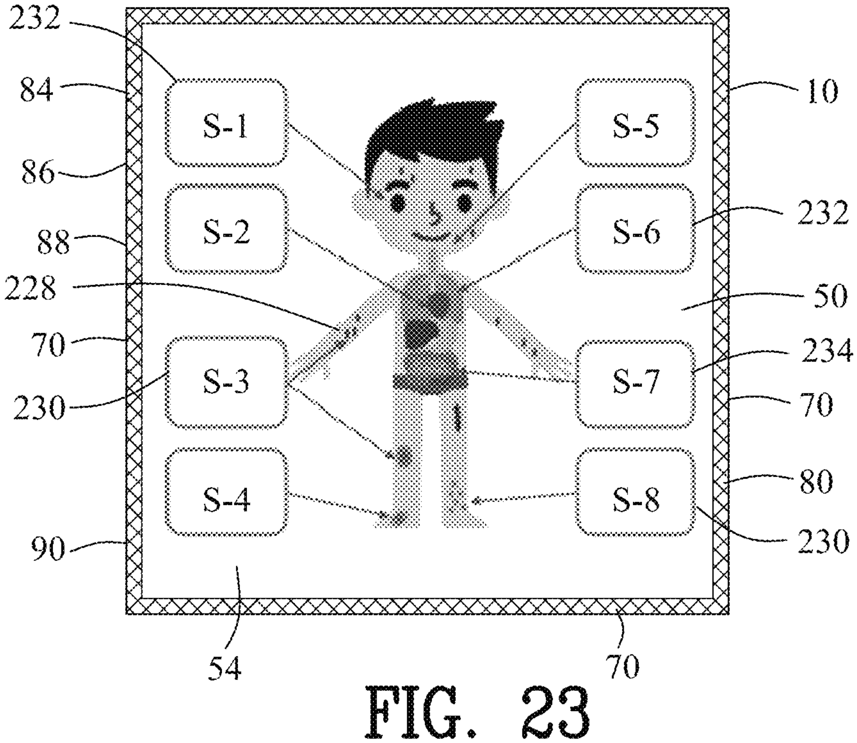
FIG. 23 is a front view of a fifth embodiment for the pharmaceutical container for housing a second fixed dose combination drug for treating an allergic condition.
Figure 24:
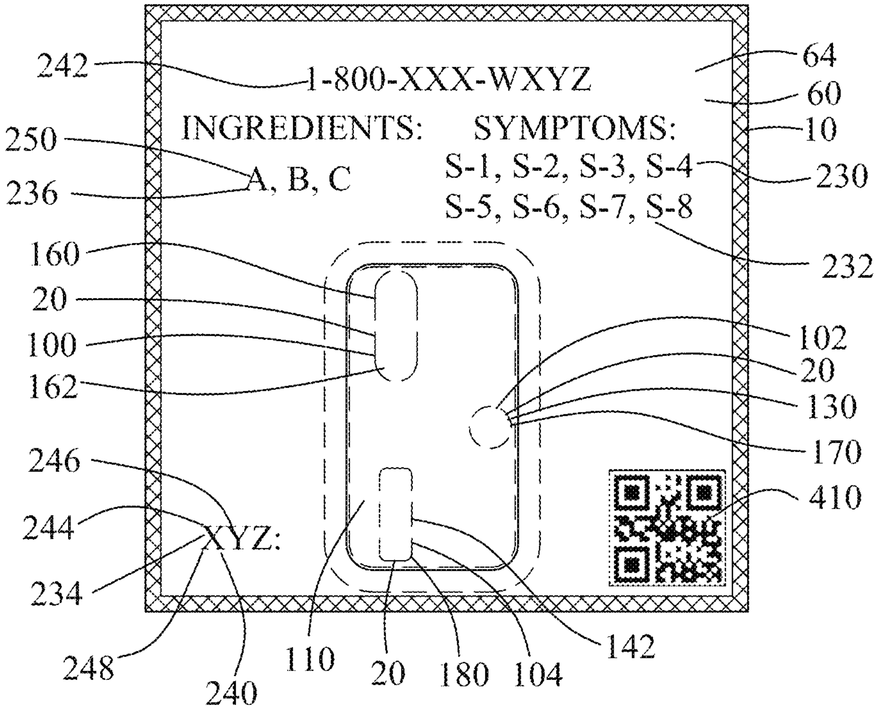
FIG. 24 is a rear view of FIG. 23.
Figure 25:
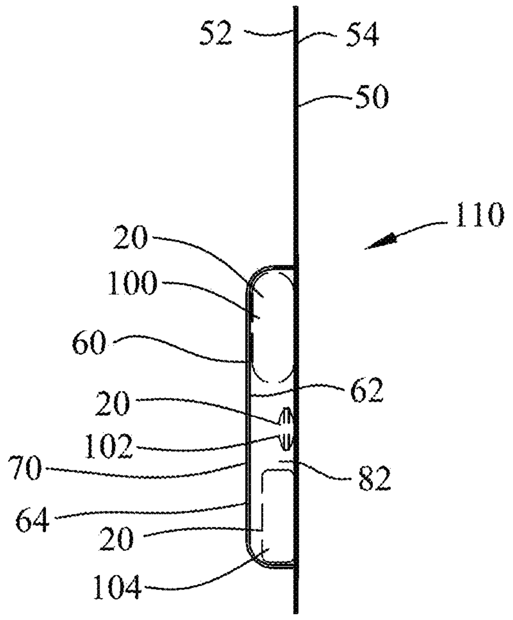
FIG. 25 is a left side view of FIGS. 21 and 23.
Figure 26:
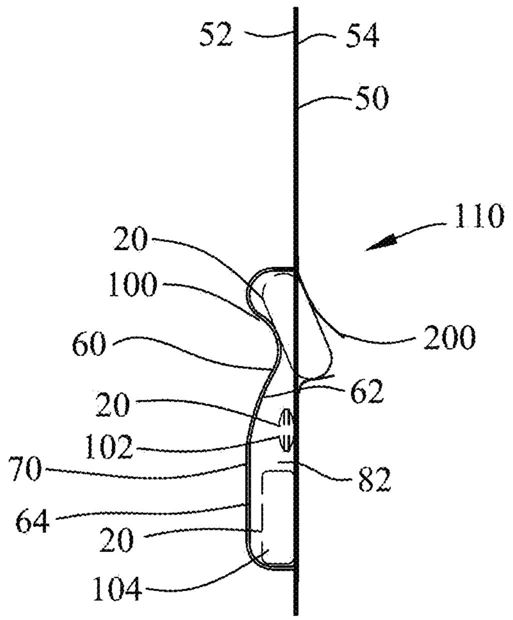
FIG. 26 is a similar view of FIG. 25 illustrating the first fixed dose combination drug or the second fixed dose combination drug piercing a lidding seal panel.
Figure 27:
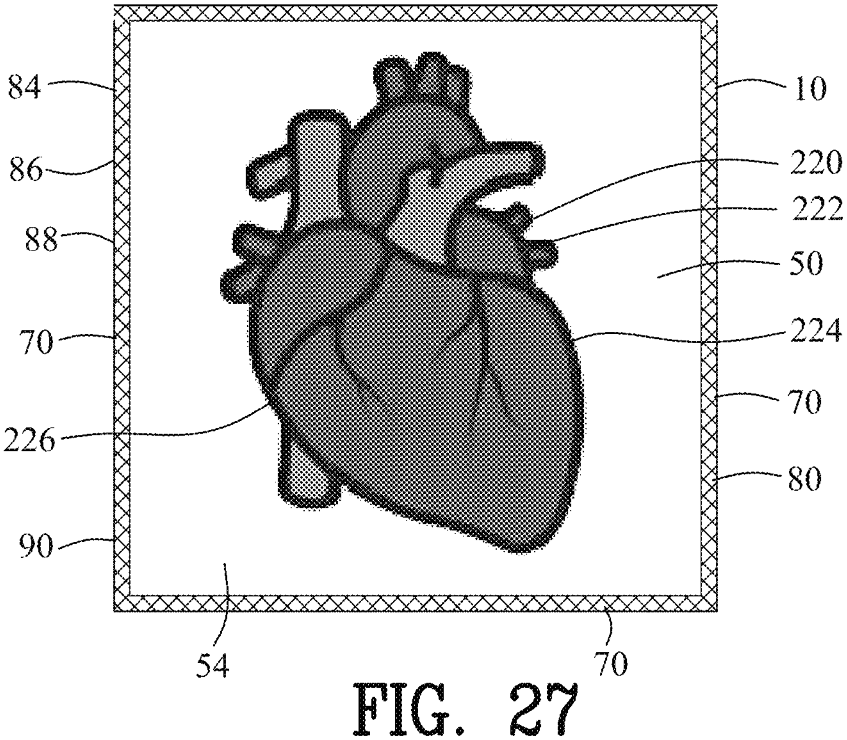
FIG. 27 is a front view of a sixth embodiment for the pharmaceutical container for housing a first fixed dose combination drug in a primary pouch chamber and a pharmaceutical substance in a secondary pouch chamber for treating a heart condition.
Figure 28:
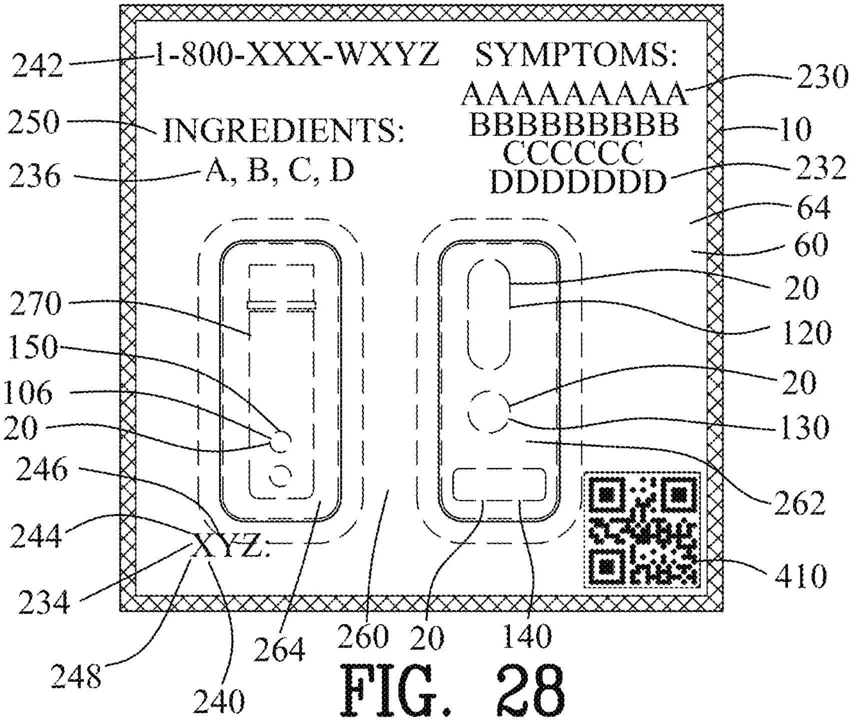
FIG. 28 is a rear view of FIG. 27.
Figure 29:
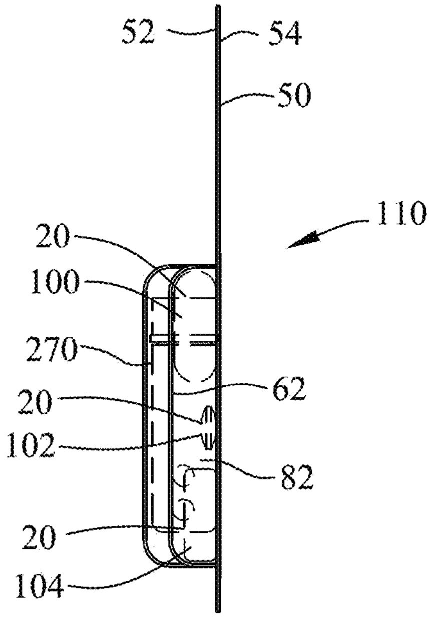
FIG. 29 is a left side view of FIG. 27.
Figure 30:
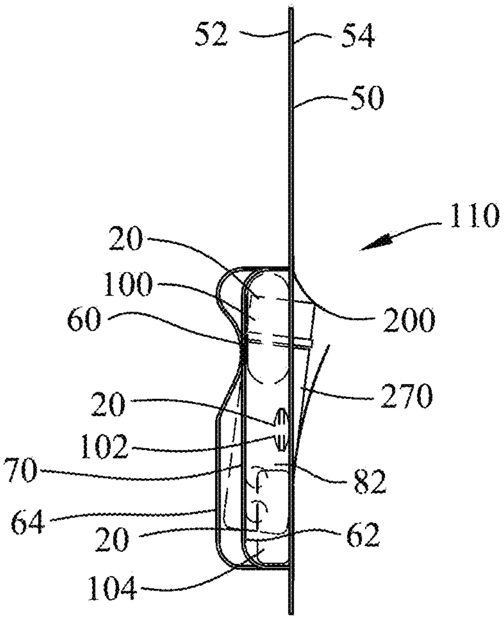
FIG. 30 is a similar view of FIG. 29 illustrating first fixed dose combination drug in a primary pouch chamber and a pharmaceutical substance in a secondary pouch chamber piercing a lidding seal panel.

The present invention further includes as shown in FIG. 19 a pharmaceutical kit 300 for treating the individual 12 having a medical condition 30. The pharmaceutical kit 300 includes a first disposable pouch 302 having a primary layer 50 and a secondary layer 60 and defining a first pouch chamber 304. A first fixed-dose combination drug 306 is within the first disposable pouch 302 for ingestion by the individual 12 for treating the medical condition 30.

A second disposable pouch 312 has a primary layer 50 and a secondary layer 60 and defines a second pouch chamber 314. A second fixed-dose combination drug 316 is within the second disposable pouch 312 for ingestion by the individual 12 for treating the medical condition 30.

The first fixed-dose combination drug 306 may include aspirin 120. The first fixed-dose combination drug 306 may further includes clopidogrel 130, effient 132 or brilinta 134. The first fixed-dose combination drug 306 may further include atorvastatin 140 or rosuvastatin 142. The first fixed-dose combination drug 306 is removed from the first disposable pouch 302 for treating coronary artery disease 32.

The second fixed-dose combination drug 316 may include ranitidine 160 or famotidine 162. The second fixed-dose combination drug 316 may further include diphenhydramine 170. The second fixed-dose combination drug 316 may further include prednisone 180. The second fixed-dose combination drug 316 is removed from the second disposable pouch 312 for treating an allergic reaction 34. The pharmaceutical kit 300 provides a pharmaceutical case 320 for organizing and transporting a plurality of disposable pouch 80 for a plurality of medical conditions 30.

The present invention also incorporates a method for treating an individual 12 having a medical condition 30. The method comprises the steps of disengaging a pouch closure 70 in a disposable pouch 80 for defining a pouch aperture 200. A first pharmaceutical substance 100 is removed from the disposable pouch 80 through the pouch aperture 200. A second pharmaceutical substance 102 is removed from the disposable pouch 80 through the pouch aperture 200. The first pharmaceutical substance 100 and the second pharmaceutical substance 102 are ingested for treating the individual 12 having the medical condition 30 by a fixed-dose combination drug 110.

The method may further include a third pharmaceutical substance 104 is removed from a secondary pouch chamber 264 of the disposable pouch 80 and through the second pouch aperture 200. The first pharmaceutical substance 100, the second pharmaceutical substance 102 and the third pharmaceutical substance 104 are ingested for treating the individual having the medical condition by a fixed-dose combination drug 110.

FIGS. 21-30 are various views of alternative embodiments of a pharmaceutical container 10 and method for housing a substance for treating an individual having a medical condition. The structure and method of the alternative embodiments as shown in FIGS. 21-30 are substantially equivalent to the first embodiment as shown in FIGS. 1-20 as set forth above. The equivalent structure and method between the second embodiment as shown in FIGS. 21-30 and the first embodiment as shown in FIGS. 1-20 share common reference numerals.

In FIGS. 21-30 the primary layer may define a lidding seal panel 400. The lidding seal panel 400 may be constructed of a backing of paperboard or of aluminum foil or plastic. The secondary layer may define a deformable bulbous panel 402. The deformable bulbous panel 402 may be constructed of a deformable web such as thermoformed plastic. The lidding seal panel 400 and the deformable bulbous panel 402 defining a push through pack or blister pack 404 for permitting a force upon the deformable bulbous panel 402 to collapse the deformable bulbous panel 402 and compressing the first pharmaceutical substance 100 and/or the second pharmaceutical substance 102 against the lidding seal panel 400 and pierce the lidding seal panel 400 with the first pharmaceutical substance 100 and/or the second pharmaceutical substance 102 to remove the first pharmaceutical substance 100 and the second pharmaceutical substance 102 from the push through pack or blister pack 404.

The pharmaceutical container 10 may further include a QR code 410 imprinted on either the primary layer 50 or the secondary layer 60. The QR code 410 may also consist of a barcode, MeCard, vCard. The QR code 410 may designate a data file for use with a computer, mobile electronic device or QR reader. The QR code 410 may provide information including contents, purpose of contents, date of manufacture, location of manufacture or company of manufacture. The QR code 410 could be utilized for preventing counterfeit pharmaceutical containers and also provide a security feature. The QR code 410 may further provide data for uploading to a central computer for the specific pharmaceutical container 10 being scanned and further provide the pharmaceutical container 10 location and the type of pharmaceutical container 10 being used. The QR code 410 may further be utilized for restocking or shipping replacement pharmaceutical containers 10 to a specific individual, company and or location. The QR code 410 may further be utilized for providing a live stream link between a mobile electronic device scanning the QR code 410 and a remote computer device consisting of audio, video or both to provide additional medical assistance and advice before and after taking the pharmaceutical substances within the pharmaceutical container 10.

The pharmaceutical container 10 may be utilized for providing medication to an individual at the first signs of medical condition and before the arrival of mobile medical services and before the patient reaches a medical facility. A time delay in administration of medications until the individual is seen by a mobile medical service or a medical facility, the individual may sustain a permanent physical damage to their body. The pharmaceutical container 10 may solve this problem by providing all the medications which are given by a mobile medical service or medical facility at the first signs of a medical condition. The pharmaceutical container 10 may be utilized by the individual having the physical condition or by a third party present with the individual.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A pharmaceutical container housing a substance for treating an individual having a medical condition, comprising:

a primary layer having an interior surface and an exterior surface;

a secondary layer having an interior surface and an exterior surface;

a pouch closure coupling said primary layer and said secondary layer for defining a disposable pouch;

said disposable pouch defining a pouch chamber between said primary layer and said secondary layer;

a first pharmaceutical substance within said pouch chamber of said disposable pouch;

a second pharmaceutical substance within said pouch chamber of said disposable pouch;

said first pharmaceutical substance and said second pharmaceutical substance defining a fixed-dose combination drug for ingestion by the individual for treating the medical condition;

an image on said disposable pouch;

said image conveying the source of the medical condition within the individual;

said image permitting the rapid selection of said fixed-dose combination drug within said disposable pouch for treating the individual having the medical condition;

a third pharmaceutical substance within said disposable pouch for treating the medical condition;

said first pharmaceutical substance includes aspirin;

said second pharmaceutical substance is clopidogrel, effient or brilinta;

said third pharmaceutical substance is atorvastatin or rosuvastatin;

said first pharmaceutical substance, said second pharmaceutical substance and said third pharmaceutical substance defining said fixed-dose combination drug for treating coronary artery disease; and said image includes a heart image.

2. The pharmaceutical container as set forth in claim 1, wherein said disposable pouch is constructed of a material selected from the group consisting of high density polyethylene (HDPE), low density polyethylene (LDPE) and linear low-density polyethylene (LLDPE).

3. The pharmaceutical container as set forth in claim 1, wherein said disposable pouch is constructed of a natural fiber; and an inner liner coupled to said interior surface of said primary layer and said interior surface of said secondary layer for providing a protective barrier; and said inner liner is a material selected from the group consisting of high density polyethylene (HDPE), low density polyethylene (LDPE) and linear low-density polyethylene (LLDPE).

4. The pharmaceutical container as set forth in claim 1, further including a perforation on said disposable pouch for assisting in creating a pouch aperture in said disposable pouch and removing said fixed-dose combination drug from said disposable pouch.

5. The pharmaceutical container as set forth in claim 1, further including a flexible zipper closure on said disposable pouch for assisting in creating a pouch aperture in said disposable pouch and removing said fixed-dose combination drug from said disposable pouch.

6. The pharmaceutical container as set forth in claim 1, further including a tear notch on said disposable pouch for assisting in creating a pouch aperture in said disposable pouch and removing said fixed-dose combination drug from said disposable pouch.

7. The pharmaceutical container as set forth in claim 1, wherein said image conveying the individual's symptom due to the medical condition; and said image permitting the rapid selection of said fixed-dose combination drug within said disposable pouch for treating the individual having the medical condition.

8. The pharmaceutical container as set forth in claim 1, further including a text on said disposable pouch;

said text conveying the individual's symptom due to the medical condition; and said text permitting the rapid selection of said fixed-dose combination drug within said disposable pouch for treating the individual having the medical condition.

9. The pharmaceutical container as set forth in claim 1, further including a text on said disposable pouch;

said text conveying the source of the individual's symptom due to the medical condition;

and said text permitting the rapid selection of said fixed-dose combination drug within said disposable pouch for treating the individual having the medical condition.

10. The pharmaceutical container as set forth in claim 1, further including a text on said disposable pouch;

said text conveying a list of said first pharmaceutical substance and said second pharmaceutical substance; and said text permitting the rapid selection of said fixed-dose combination drug within said disposable pouch for treating the individual having the medical condition.

11. The pharmaceutical container as set forth in claim 1, further including a text on said disposable pouch; and said text is a listing of information selected from the group consisting of telephone numbers for emergency services, hospitals and physicians and instructions for further first aid to be applied to the individual.

12. The pharmaceutical container as set forth in claim 1, further including a text on said disposable pouch; and said text is a listing of weight of said first pharmaceutical substance and said second pharmaceutical substance.

13. A pharmaceutical container housing a substance for treating an individual having a medical condition, comprising:

a disposable pouch having a primary layer and a secondary layer and defining a pouch chamber;

a pouch closure coupled to said disposable pouch for sealing said disposable pouch;

a first pharmaceutical substance within said pouch chamber for treating the medical condition;

a second pharmaceutical substance within said pouch chamber for treating the medical condition;

said first pharmaceutical substance and said second pharmaceutical substance defining a fixed-dose combination drug for ingestion by the individual for treating the medical condition;

an image on said disposable pouch;

said image conveying the source of the medical condition within the individual;

said image permitting the rapid selection of said fixed-dose combination drug within said disposable pouch for treating the individual having the medical condition;

a third pharmaceutical substance within said disposable pouch for treating the medical condition;

said first pharmaceutical substance is ranitidine or famotidine;

said second pharmaceutical substance includes diphenhydramine;

said third pharmaceutical substance includes prednisone; and said first pharmaceutical substance, said second pharmaceutical substance and said third pharmaceutical substance defining said fixed-dose combination drug for treating an allergic reaction; and said image includes a skin aliment image.

* * * * *